C. HAMMER.
POLYGONAL CLOSURE.
APPLICATION FILED DEC. 22, 1919.

1,867,254.

Patented Feb. 1, 1921.
2 SHEETS—SHEET 1.

INVENTOR
Charles Hammer
BY
Wm H. Reid,
ATTORNEY

UNITED STATES PATENT OFFICE.

CHARLES HAMMER, OF QUEENS, NEW YORK, ASSIGNOR TO AMERICAN METAL CAP COMPANY, OF BROOKLYN, NEW YORK, A CORPORATION OF NEW YORK.

POLYGONAL CLOSURE.

1,367,254.  Specification of Letters Patent.  Patented Feb. 1, 1921.

Application filed December 22, 1919. Serial No. 346,580.

*To all whom it may concern:*

Be it known that I, CHARLES HAMMER, a citizen of the United States, residing at Queens, in the county of Queens and State of New York, have invented certain new and useful Improvements in Polygonal Closures, of which the following is a specification.

This invention relates to closures for bottles and jars, particularly of the form of bottles, such as used for catsup and other liquid materials, and to preserve jars or glasses, that are sealed by means of a metal cap.

The object of the invention is to provide a device of this character that will have an improved friction engagement or seal on the top of the bottle or jar, that will be sufficient to retain the closure in position, yet admit of its easy removal, and also provide for future use or replacement.

In the accompanying drawing showing embodiments of my invention, Figure 1 is a side elevation of the upper portion of a bottle, with the closure in position.

This invention comprises a closure formed of a top portion, and a sleeve portion, both of which are made of thin sheet metal, or at least the sleeve portion is of such formation. The sleeve portion has its upper part formed of thin flat vertical walls that meet at an angle to form a regular polygon in section. The lower portion of the sleeve is formed substantially cylindrical, and is larger than the upper polygonal portion.

As shown in Figs. 1–6, the closure 8 consists of a top portion 9, preferably flat, and a side portion or sleeve denoted generally by 10. The sleeve is formed of thin sheet metal, and is joined to the top in any suitable manner, such as by an interlocking joint 11, or other means. If preferred the top and sides may be integral, and drawn from a blank of sheet metal.

Figure 4:
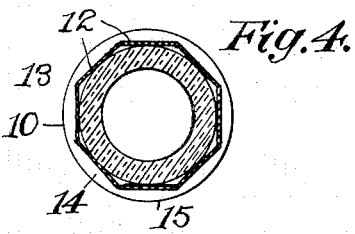
Fig. 4 is a transverse section through the closure and bottle, on the line 4—4 of Fig. 2.
Figure 5:
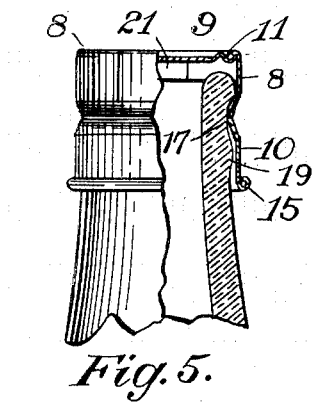
Fig. 5 is a side elevation, partly in section, showing a slight modification.
Figure 6:
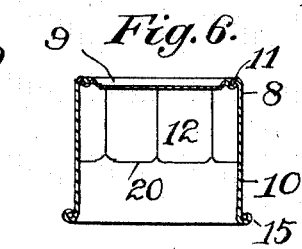
Fig. 6 is a section through a cap on the line 6—6 of Fig. 3.
Figure 7:
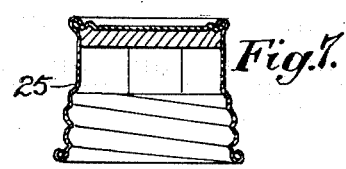
Fig. 7 shows a similar cap corrugated to form screw threads on the lower portion.
Figure 8:
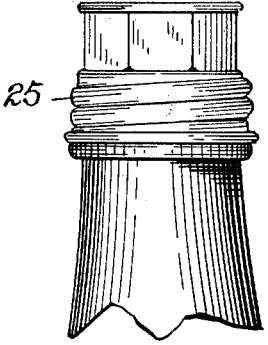
Fig. 8 shows the screw threaded cap on a bottle.

The side member 10 is formed of a series of flat vertical walls 12, of which eight are shown. These are similar and meet at an angle, at 13, so that they form a regular polygon in section, as indicated in Fig. 4. While I have shown eight sides at this portion of the closure, it is to be understood that a greater or less number of sides could be employed and produce the same effect.

Below this polygonal portion the side wall is formed cylindrical, as shown at 14, and is made of greater diameter than the upper portion of the closure. That is, the internal diameter of the cylindrical portion is greater than the distance apart of the opposed flat vertical walls, as indicated in Fig. 4. At the lower end the margin may be bent back on itself to form a bead or wire edge 15 if desired. The polygonal portion of the closure occupies about one-half of the sleeve portion of the closure, and where the flat vertical walls 12 terminate a kind of annular shoulder 20 is formed.

This form of closure is especially designed for use on a form of bottle having a neck portion 16 containing a groove 17 below the top, whereby a bead 18 is formed. The outer wall of the neck below the groove 17 may be formed of greater diameter at 19 than the diameter of the bead 18. The closure is so designed relative to this form of bottle, that the distance apart of the opposed vertical walls on the inside of the closure, is substantially the same as, or slightly less than the diameter of the bead 18. The lower cylindrical portion 14 has its exterior diameter about the same as, or slightly greater than the outer diameter of the bottle neck at the portion 19 below the groove 17.

When this closure is applied to the bottle 16, the lower cylindrical portion, forming a kind of skirt, will fit loosely on the bead 18, and guide the closure as it is pushed downwardly, and will thereupon engage the enlarged portion 19 of the bottle. The inner faces of the flat walls 12 will engage the bead 18 along their middle vertical portions, and can obviously spring slightly to have a resilient fit on the bead, as indicated in Fig. 4. The skirt will engage the lower enlarged portion 19 of the bottle to guide and center the closure as it is forced downwardly. If desired the closure may contain a lining disk or gasket 21, to engage the top edge of the bottle.

A closure of this character will have a tight engagement with the bottle, sufficient to form a tight seal and be retained on the bottle. Yet the closure can be easily removed without injury or distortion, and is capable of further use.

Figure 9:
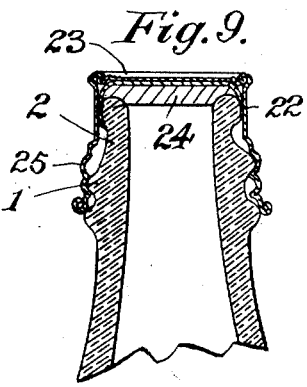
Fig. 9 is a vertical section through the latter cap.
Figure 10:
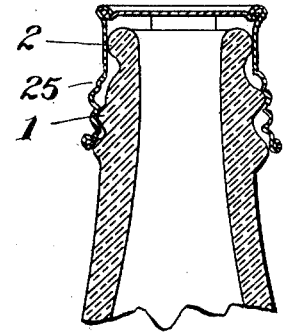
Fig. 10 shows the parts set forth in Fig. 9 with the Crown cap removed.

In Figs. 7, 8, 9 and 10, a screw-threaded cap 25 is shown applied to a bottle neck 2 provided with screw threads at 1, and a bead 22 at the top. In Fig. 9 the bottle is shown as closed by a cap 23 of the character known as the Crown cap, which has a short flange or skirt that is pressed inwardly around the bead 22; and which cap is provided with a sealing disk or lining 24 that is forced against the top edge of the bottle. It will be seen from this view that the cap is applied over the Crown closure and engages the threads on the bottle neck. When the sealed bottle is first used the closure is unscrewed, and the Crown cap is removed. Where a part only of the contents are emptied, it is desirable to again close the bottle, and my cap can be screwed on to the same to protect the contents, without another Crown cap being applied. This is indicated in Fig. 10.

Figure 11:
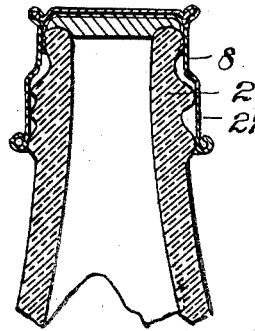
Fig. 11 shows the cap of Fig. 6 applied to a screw threaded bottle neck.
Figure 12:
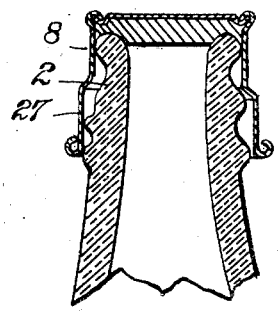
Fig. 12 shows the latter with the Crown cap omitted.

In Fig. 11, I show the closure 8 applied to the bottle 2 containing the Crown closure 23. The lower cylindrical portion 27 of the cap will engage the screw threads of the bottle, and the upper flat faces will engage the outside of the Crown cap, that will retain the closure in position. After removal of the Crown cap, my closure can be replaced, and will remain on the bottle. The projecting portions of the Crown cap will engage the central portion of the flat vertical walls of the polygonal portion, that will expand to a considerable degree. After removal of the Crown cap, and return of the polygonal cap, these vertical walls will engage the bead 22 on the bottle, as shown in Fig. 12.

Figure 1:
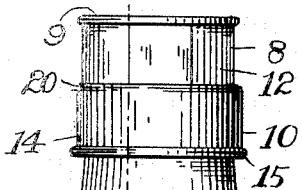
Figure 2:
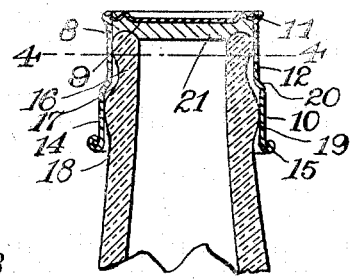
Fig. 2 is a vertical section through the parts as shown in Fig. 1.
Figure 3:
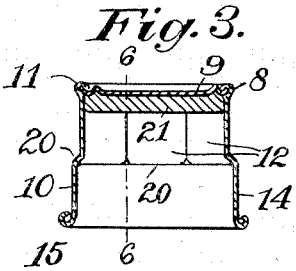
Fig. 3 is a vertical section through the closure.
Figure 13:
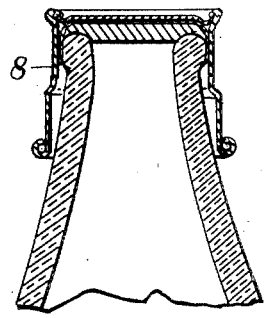
Fig. 13 shows the cap of Fig. 6 on another form of bottle.
Figure 14:
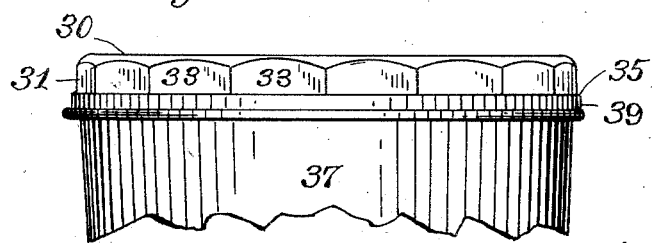
Fig. 14 shows a slightly modified form of my closure applied to a jar.
Figure 16:
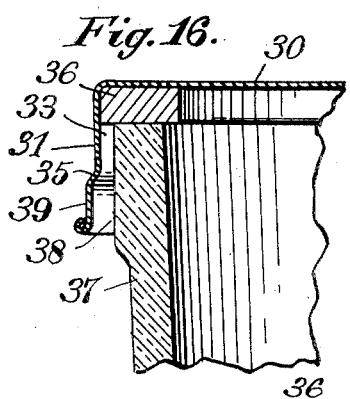
Fig. 16 is a partial vertical section on the line 16—16 of Fig. 15.

In Fig. 13 the closure 8 as shown in Fig. 3, is illustrated as applied to the bottle as shown in Fig. 2, with the employment of the Crown cap.

Figure 15:
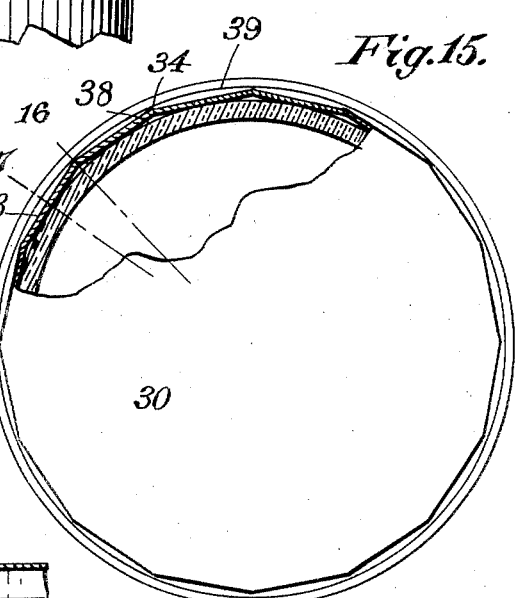
Fig. 15 is a plan view, partly in section of the latter.
Figure 17:
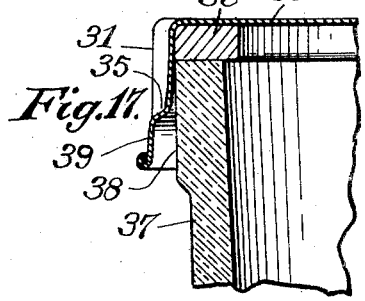
Fig. 17 is a partial vertical section on the line 17—17 of Fig. 15.

In Figs. 14–17, I show a similar form of polygonal closure designed to be applied to a wide-mouth jar, particularly of the kind known as preserve glasses. In this modification the closure comprises a top 30, shown as flat, and a sleeve portion 31, that is here shown as integral with the top. This sleeve portion of the closure that is made from thin sheet metal, has the upper part formed of a circular series of flat vertical walls 33, that meet at an angle at 34, such structure forming a regular polygon in section, as indicated in Fig. 15. The lower portion of this closure is shown as substantially cylindrical, and comprises a skirt portion 39, connecting with the upper polygonal portion 33 by a slight offset 35. This closure may have a flat gasket lining 36 on the inner face, for engagement with the top edge of the jar.

The closure is shown as applied to a jar 37 having a straight sealing face or finish 38. The polygonal portion of this closure is so designed relative to this jar, that the diametral distance apart of the opposed flat faces or vertical walls, on the inside, is equal to, or slightly less than the diameter of the sealing face 38 of the jar. Obviously the skirt will be slightly offset from the jar wall, and will act as a guide when the closure is first applied. When this closure is placed on the jar and forced down, the middle vertical portion of each flat face will engage the wall 38 of the jar by a tight fit, and these flat faces can spring slightly by reason of the resilient construction of the closure. This will cause a strong and tight engagement of the closure on the jar. The closure may be forced down under pressure to cause the gasket ring to have a tight engagement with the upper edge of the jar, and to compensate for irregularities and cavities in the top edge, to cause a tight and hermetic seal. It will be further understood that a closure of this construction can be readily removed from the jar by applying a moderate amount of exertion, and without injuring the closure, so that it may be used a number of times on the closure.

This application is a continuation in part of an application filed by me March 15, 1919, Serial Number 282,919; also a continuation in part of an application filed by me April 23, 1919, Serial Number 292,193.

What I claim is:

1. A bottle closure in the form of a cap of thin sheet metal, comprising a top and a substantially cylindrical side or body member of considerable length, the body member being provided at the middle portion with an annular shoulder, the upper gripping portion above the said shoulder being formed of flat vertical walls meeting at an angle to form a regular polygon in section.

2. A bottle closure in the form of a cap of thin sheet metal, comprising a top and a substantially cylindrical side or body member of considerable length, the body member being provided at the middle portion with an annular shoulder, the upper gripping portion above the said shoulder being formed of flat vertical walls meeting at an angle to form a regular polygon in section, the distance apart internally of said opposed vertical walls being less than the inner diameter of the portion below said shoulder.

3. A bottle closure in the form of a cap of thin sheet metal, comprising a top and a substantially cylindrical side or body member of considerable length, the body member being provided at the middle portion with an annular shoulder, the upper gripping portion above the said shoulder being formed of flat vertical walls meeting at an angle to form a regular polygon in section, the lower portion below the shoulder being corrugated to constitute a screw thread adapted to engage a screw-threaded bottle neck, the distance apart internally of said opposed vertical walls being less than the inner diameter of the screw threaded portion below said shoulder.

4. The combination with a bottle having an external groove in the neck to form a bead, of a bottle cap comprising a top portion and a sleeve portion formed of thin sheet metal, the sleeve portion having the upper part formed of flat vertical walls meeting at an angle to form a regular polygon in section, said cap being adapted to engage the said bottle bead at the middle portion of its flat walls, with the lower portion of the sleeve forming a guide by engagement with the bottle portion below the groove.

5. The combination with a bottle having an external groove in the neck to form a bead of less diameter than the neck below the bead, of a bottle cap comprising a top portion and a sleeve portion formed of thin sheet metal, the sleeve portion having the upper part formed of flat vertical walls meeting at an angle to form a regular polygon in section, the lower portion of the sleeve being of a greater diameter internally than the distance apart of said opposed vertical walls, said cap being adapted to engage the said bottle bead at the middle portion of its flat walls, with the lower portion forming a guide by engagement with the bottle portion below the groove.

6. The combination of a bottle having an external groove in the neck to form a bead at the top, the neck below the bead being provided with screw threads of greater diameter than the bead, and a bottle cap comprising a top portion and a sleeve portion formed of thin sheet metal, the sleeve portion having the upper part formed of flat vertical walls meeting at an angle to form a polygon in section, the lower portion of the sleeve being provided with corrugations extending around the sleeve to constitute a screw thread, said cap being adapted to engage the bottle at the middle portion of its said flat walls, with the screw threaded portions of the bottle and cap in engagement.

7. The combination with a bottle having an external groove in the neck to form a bead, a Crown cap sealed on the beaded top, and a bottle cap comprising a top portion and a sleeve portion formed of thin sheet metal, the sleeve portion having the upper part formed of flat vertical walls meeting at an angle to form a polygon in section, said cap being adapted to engage the Crown cap sealed on the bottle top by the middle portion of its flat walls.

8. The combination of a bottle having an external groove in the neck to form a bead at the top, the neck below the bead being provided with screw threads and of greater diameter than the bead, a Crown cap sealed on the beaded top, and a bottle cap comprising a top portion and a sleeve portion formed of thin sheet metal, the sleeve portion having the upper part formed of flat vertical walls meeting at an angle to form a polygon in section, the lower portion of the sleeve being provided with corrugations extending around the sleeve to constitute a screw thread, said cap being adapted to engage the Crown cap sealed on the bottle bead by the middle portion of its flat walls, with the screw threaded portions of the bottle and cap in engagement.

9. The combination with a bottle having an external groove in the neck to form a bead of less diameter than the neck below the bead, a Crown cap sealed on the bottle top, and a bottle cap comprising a top portion and a sleeve portion formed of thin sheet metal, the body member being provided at the middle portion with an annular shoulder, the sleeve portion above the shoulder being formed of flat vertical walls meeting at an angle to form a polygon in section, the lower portion of the sleeve being of a greater diameter internally than the distance apart of said opposed vertical walls, said cap being adapted to engage the Crown cap sealed on the bottle top by the middle portion of its flat walls, with the lower portion forming a guide by engagement with the bottle portion below the groove.

10. The combination with a bottle having an external groove in the neck to form a bead at the top, the neck below the bead being provided with screw threads and of greater diameter than the bead, a Crown cap sealed on the beaded top and a bottle cap comprising a top portion and a sleeve portion formed of thin sheet metal, the body member being provided at the middle portion with an annular shoulder, the sleeve portion having the upper part formed of flat vertical walls meeting at an angle to form a polygon in section, the lower portion of the sleeve being provided with corrugations extending around the sleeve to constitute a screw thread, said cap being adapted to engage the Crown cap sealed on the said bottle bead by the middle portion of its said flat walls, with the screw threaded portions of the bottle and cap in engagement.

Signed at New York city, N. Y., on December 15th, 1919.

CHARLES HAMMER.